(12) United States Patent
Heibel et al.

(10) Patent No.: US 6,233,932 B1
(45) Date of Patent: May 22, 2001

(54) FULLY HYDRAULIC BRAKE POWER GENERATOR/MASTER CYLINDER UNIT WITH IMPROVED BRAKE PRESSURE FEEDBACK

(75) Inventors: Helmut Heibel, Moschheim; Josef Knechtges, Mayen, both of (DE)

(73) Assignee: Lucas Industries Public Limited Company (GB)

( * ) Notice: Subject to any disclaimer, the term of this patent is extended or adjusted under 35 U.S.C. 154(b) by 0 days.

(21) Appl. No.: 09/507,176

(22) Filed: Feb. 18, 2000

Related U.S. Application Data

(63) Continuation of application No. PCT/EP98/05083, filed on Aug. 11, 1998.

(30) Foreign Application Priority Data

Aug. 22, 1997 (DE) .............................. 197 36 646

(51) Int. Cl.[7] .................................................. B60T 13/12
(52) U.S. Cl. .................................. 60/550; 60/554
(58) Field of Search .................................. 60/550, 554

(56) References Cited

U.S. PATENT DOCUMENTS

| | | | |
|---|---|---|---|
| 2,820,344 | * | 1/1958 | Stelzer .................................. 60/551 |
| 3,334,548 | * | 8/1967 | Van House .......................... 60/550 X |
| 4,137,718 | | 2/1979 | Belart . |
| 4,334,713 | * | 6/1982 | Dauvergne .............................. 303/54 |
| 4,534,171 | | 8/1985 | Leiber .................................. 60/554 X |
| 4,655,511 | | 4/1987 | Leiber . |
| 4,905,570 | | 3/1990 | Reinartz et al. . |

FOREIGN PATENT DOCUMENTS

| | | |
|---|---|---|
| 2312641 | 9/1974 | (DE) . |
| 3409705 | 9/1985 | (DE) . |
| 3733863 C2 | 4/1989 | (DE) . |
| 2615805 C2 | 10/1997 | (DE) . |

* cited by examiner

*Primary Examiner*—John E. Ryznic
(74) *Attorney, Agent, or Firm*—MacMillan, Sobanski & Todd, LLC

(57) ABSTRACT

A fully hydraulic brake power generator/master cylinder unit (10) for a vehicle brake system has a housing (12) with a bore (14) which is formed therein and in which a primary piston (16) is arranged sealingly and displaceably. Located in the bore (14) is a first pressure chamber (22), one boundary wall of which is formed by one end wall (20) of the primary piston (16). In order to actuate the unit (10), there is an input member (60) which is displaced during actuation. A hydraulic booster stage (38), which has a booster chamber (44) with an inlet for hydraulic fluid under pressure, acts on the primary piston (16). In order to improve the simulation of brake pressure feedback via the input member (60), a spring arrangement (70) is provided, with a first spring (72) and a second spring (74) which are connected in series. The spring force of the second spring (74) is detectably greater than the spring force of the first spring (72). When the unit (10) is actuated, if the hydraulic booster stage (38) fails essentially only the force of the first spring (72) determines the brake pressure feedback.

14 Claims, 3 Drawing Sheets

FULLY HYDRAULIC BRAKE POWER GENERATOR/MASTER CYLINDER UNIT WITH IMPROVED BRAKE PRESSURE FEEDBACK

CROSS REFERENCE TO RELATED APPLICATIONS

This application is a continuation of International Application No. PCT/EP98/05083 filed Aug. 11, 1998, which claims priority to German Patent Application No. 19736646.5 filed Aug. 22, 1997.

BACKGROUND OF THE INVENTION

The invention relates to a fully hydraulic brake power generator/master cylinder unit according to the precharacterizing clause of claim 1.

In contrast to the brake booster/master cylinder units still predominantly used today, in fully hydraulic brake power generator/master cylinder units the brake power is not boosted or generated with the aid of a vacuum, but purely hydraulically. In a similar way to conventional vacuum brake boosters, the actuating force normally introduced via a brake pedal by the vehicle driver is boosted proportionally, in that hydraulic fluid is supplied under pressure in a controlled manner by a valve to a booster stage which acts on the pressure chamber or pressure chambers of the master cylinder and thus builds up in the latter the brake pressure which is then transferred to the associated wheel brakes via the individual brake circuits of the vehicle brake system. When the brake pedal is released, this booster stage is then relieved of pressure again under the control of said valve.

In particular embodiments of fully hydraulic brake power generator/master cylinder units, normally, that is to say when the booster stage is functioning properly, their input member is no longer used for introducing power into the unit, but, instead, is employed only for actuating the unit, in that the input member is merely displaced, for example by the depression of a brake pedal connected to the input member. The displacement of the input member is sensed, and a corresponding hydraulic pressure is built up in the booster stage as a function of this displacement, in order to generate the brake power desired by the driver. In this case, the hydraulic pressure emanates from an external source, for example from a pressure accumulator or from a rapid-response hydraulic pump. Only when the hydraulic booster stage fails can the vehicle driver couple the input member mechanically, normally to the primary piston of the master cylinder, by vigorously depressing the brake pedal, so as then to build up at least some brake pressure by depressing the brake pedal further and by means of the resulting displacement of the primary piston.

Since the vehicle driver therefore normally actuates the brake power generator/master cylinder unit only indirectly, the unit itself, in contrast to brake power generator/master cylinder units conventional hitherto, does not give him any feedback on the brake pedal with regard to the brake pressure which has been built up in the unit, thus making it difficult to actuate the brake pedal in a metered manner.

In order to improve the meterability of the brake system in brake power generator/master cylinder units without direct brake pressure feedback to the brake pedal, it is known to simulate brake pressure feedback, for example by means of a spring arrangement, so that the customary behavior of a conventional brake booster/master cylinder unit, in which higher brake pressures require a higher pedal pressure, is imparted to the driver artificially. However, the problem of the known arrangements for artificially generated brake pressure feedback is that, when the hydraulic booster stage is not functioning, for braking purposes the spring force serving for artificial brake pressure feedback to the brake pedal first has to be overcome by the driver, before it is possible to build up brake pressure by a correspondingly more pronounced actuation of the brake pedal. On the basis of this behavior of the brake system, the driver may be given the feeling that his efforts are in vain and may therefore think, incorrectly, that the brake system is entirely inoperable.

SUMMARY OF THE INVENTION

The object on which the invention is based is to develop a brake power generator or a brake power generator/master cylinder unit with artificially generated brake pressure feedback, to the effect that, if the hydraulic booster stage fails, the unit can be actuated without any detectable hindrance by the spring force serving for artificial brake pressure feedback. Furthermore, according to one development, the meterability of such brake power generator/master cylinder units is to be further improved.

Proceeding from the brake power generator/master cylinder unit mentioned in the introduction, this object is achieved, according to the invention, in that the spring arrangement serving for artificial brake pressure feedback to the brake pedal has a first spring and a second spring which are connected in series, the spring force of the second spring being detectably greater than the spring force of the first spring, and in that, when the brake power generator/master cylinder unit is actuated, if the hydraulic booster stage fails essentially only the first spring carries out brake pressure feedback. Thus, when the brake power generator/master cylinder unit according to the invention is functioning properly, a user of said unit receives the desired simulated brake pressure feedback in the usual way, without having to overcome excessive resistance for braking purposes if the hydraulic booster stage fails.

The other advantage of the solution according to the invention is that, even if the hydraulic booster stage fails, the brake pedal does not execute an idle travel in the initial phase of actuation, but has to be actuated against the spring force of the first spring which, however, is markedly lower than that of the second spring. This avoids panic reactions on the part of the driver, which may occur when a driver notices the "slack travel" of the brake pedal, that is to say when he does not detect any resistance when he depresses the brake pedal.

The spring forces of the two springs are to be so different that a user of the brake power generator/master cylinder unit according to the invention can detect this difference clearly. If the hydraulic booster stage fails, the driver can then easily take note of this failure from the markedly lower resistance of the brake pedal in the initial phase. Detectably different spring forces can be achieved, for example, by means of detectably different spring constants of the two springs of the spring arrangement. Alternatively, it is also possible to use springs having an at least similar spring constant, the second spring being installed in the highly compressed state and the first spring in the fully expanded state.

According to a preferred embodiment of the brake power generator/master cylinder unit according to the invention, when the latter is actuated, the first spring remains ineffective in terms of brake pressure feedback if the hydraulic booster stage is functioning properly. This means that the simulated brake pressure feedback to the brake pedal is then brought about only by the second spring. On account of the markedly different spring forces of the two springs, if the hydraulic booster stage fails the second spring serves essentially for transmitting the actuating force exerted on the brake pedal to the first spring which is then compressed. In this case, the second spring is not, or in any event not appreciably, compressed.

In preferred embodiments of the brake power generator/master cylinder unit according to the invention, when the latter is actuated, if the hydraulic booster stage fails the second spring is just displaced, together with the input member, in particular, relative to the housing of the brake power generator/master cylinder unit. This constitutes an elegant method of rendering the second spring essentially ineffective in terms of simulated brake pressure feedback if the hydraulic booster stage has failed. Advantageously, in such an embodiment, the first spring is prevented from being compressed, when the hydraulic booster stage is functioning properly. Particularly preferably, the hydraulic pressure in the hydraulic booster stage is utilized to prevent the first spring from being compressed. When this hydraulic pressure lapses if the hydraulic booster stage fails, the force preventing compression of the first spring is no longer present and the changeover according to the invention between the two springs of the spring arrangement occurs automatically, that is to say the second spring can be displaced, without itself being detectably compressed, and the first spring can be compressed.

Advantageously in terms of design, the booster stage has a piston guided displaceably in the bore of the housing of the brake power generator/master cylinder unit, and the first spring is supported functionally between said housing and the piston, whilst the second spring is supported functionally between the piston and the input member. The term "functional" means, here, that the two springs are supported on said parts in terms of functioning; for this purpose, it is not necessary for the two springs to be supported directly on said parts.

In the embodiment described above, the piston of the booster stage is preferably a cup-shaped hollow piston which, together with that end wall of the primary piston which is located opposite one primary piston end wall constituting a boundary wall of the first pressure chamber, delimits the booster chamber. Such an embodiment results in a compact design with few parts and makes it possible in a simple way to implement the abovementioned automatic changeover between the two springs if the booster stage fails.

Advantageously, in all the embodiments of the brake power generator/master cylinder unit according to the invention, the displacement of the input member taking place during the actuation of said unit is damped, in particular fluid-damped. This prevents the spring arrangement used for simulating the brake pressure feedback from vibrating and thus giving rise, due to feedback via the brake pedal, to pressure fluctuations in the brake circuits which are perceived by the driver as undesirable erratic changes in deceleration. The damping of the input member thus leads, particularly in the case of abrupt actuation of the brake power generator/master cylinder unit, to better meterability and a more comfortable operating behavior of the brake system.

The abovementioned design of a brake power generator/master cylinder unit is preferably developed, in that that end of the input member which faces the unit is of piston-shaped design and projects displaceably into a damping chamber, out of which fluid forced as a result of displacement of the input member can flow off only through a throttle. In this case, for the purpose of a compact design, the damping chamber is arranged in the primary piston and the input member is designed in such a way that it passes through the booster stage. The input member consequently projects from outside through the booster stage into the damping chamber.

According to a development of this embodiment, an end region of the piston-shaped end of the input member is advantageously of hollow design and is guided on a pin-shaped projection of the primary piston, said projection being arranged in the damping chamber. If, in such a version, the hollow end region of the input member is also filled with hydraulic fluid, the pin-shaped projection of the primary piston preferably has a duct which makes a fluid connection between the hollow end region of the input member and the damping chamber arranged in the primary piston. Said duct can thereby form the abovementioned throttle; a throttle may, however, also be provided, additionally or alternatively, at another location.

For safety reasons, each embodiment of the brake power generator/master cylinder unit according to the invention is advantageously designed in such a way that, when the unit is actuated, the input member is automatically coupled to the primary piston if the hydraulic booster stage fails. Such a mechanical push-through ensures that, even if the booster stage is defective, brake pressure can be built up in the pressure chamber or pressure chambers of the master cylinder at least after a particular actuating travel has been executed.

In order to avoid the idle travel of the input member, normally occurring if the booster stage fails, until there is mechanical coupling to the primary piston, a preferred embodiment of the brake power generator/master cylinder unit according to the invention is provided with a separate coupling between the input member and the primary piston, said coupling automatically coupling the two parts to one another when the booster stage has failed. For this purpose, the hollow end region of the input member is guided on a pin-shaped projection of the primary piston, said projection being provided with a thread. Arranged in the hollow end region of the input member coaxially to the pin-shaped projection is a sleeve rotatable about the latter and having an internal thread which is in engagement, free of any selflocking, with the thread on the pin-shaped projection. The sleeve has a clamping cone and, by means of the latter, is prestressed resiliently into engagement with a complementary clamping cone which is formed in the hollow end region of the input member. Furthermore, the hollow end region of the input member has located in it an axially displaceable thrust sleeve which coaxially surrounds the pin-shaped projection and of which the axial displacement counter to the resilient prestress of the sleeve causes the two clamping cones to come out of engagement. Normally, that is to say when the booster stage is functioning properly, the thrust sleeve is pressed axially against the rotatable sleeve, so that the two clamping cones are out of engagement and relative displacement can take place between the input member and the pin-shaped projection, in that, the rotatable sleeve rotates about the pin-shaped projection due to the axial force of the input member acting on said sleeve and due to the selflocking-free thread pairing between said rotatable sleeve and said pin-shaped projection. If the booster stage is defective, no pressure is exerted on the axially displaceable thrust sleeve, so that the two clamping cones are in engagement with one another, thus preventing the rotatable sleeve from being rotated about the pin-shaped projection and thus leading to direct mechanical coupling between the input member and the primary piston.

Particularly advantageously, in the embodiment just described, the hollow end region of the input member is in fluid connection with the booster stage, specifically in such a way that, when the booster stage is functioning properly, the hydraulic pressure in the booster chamber displaces the thrust sleeve counter to the resilient prestress of the rotatable sleeve. Since there is not sufficient hydraulic pressure in the booster chamber if the booster stage fails, such a design leads automatically to the mechanical coupling, then desirable, between the input member and primary piston.

The automatic coupling according to the invention of the input member to the primary piston if the hydraulic booster stage fails, said coupling eliminating virtually completely the actuating travel loss customary hitherto, may advantageously also be employed independently of the improved brake pressure feedback according to the invention.

The invention is explained in more detail below by means of two exemplary embodiments with reference to the accompanying diagrammatic drawings in which:

DETAILED DESCRIPTION OF THE PREFERRED EMBODIMENT

Figure 1:
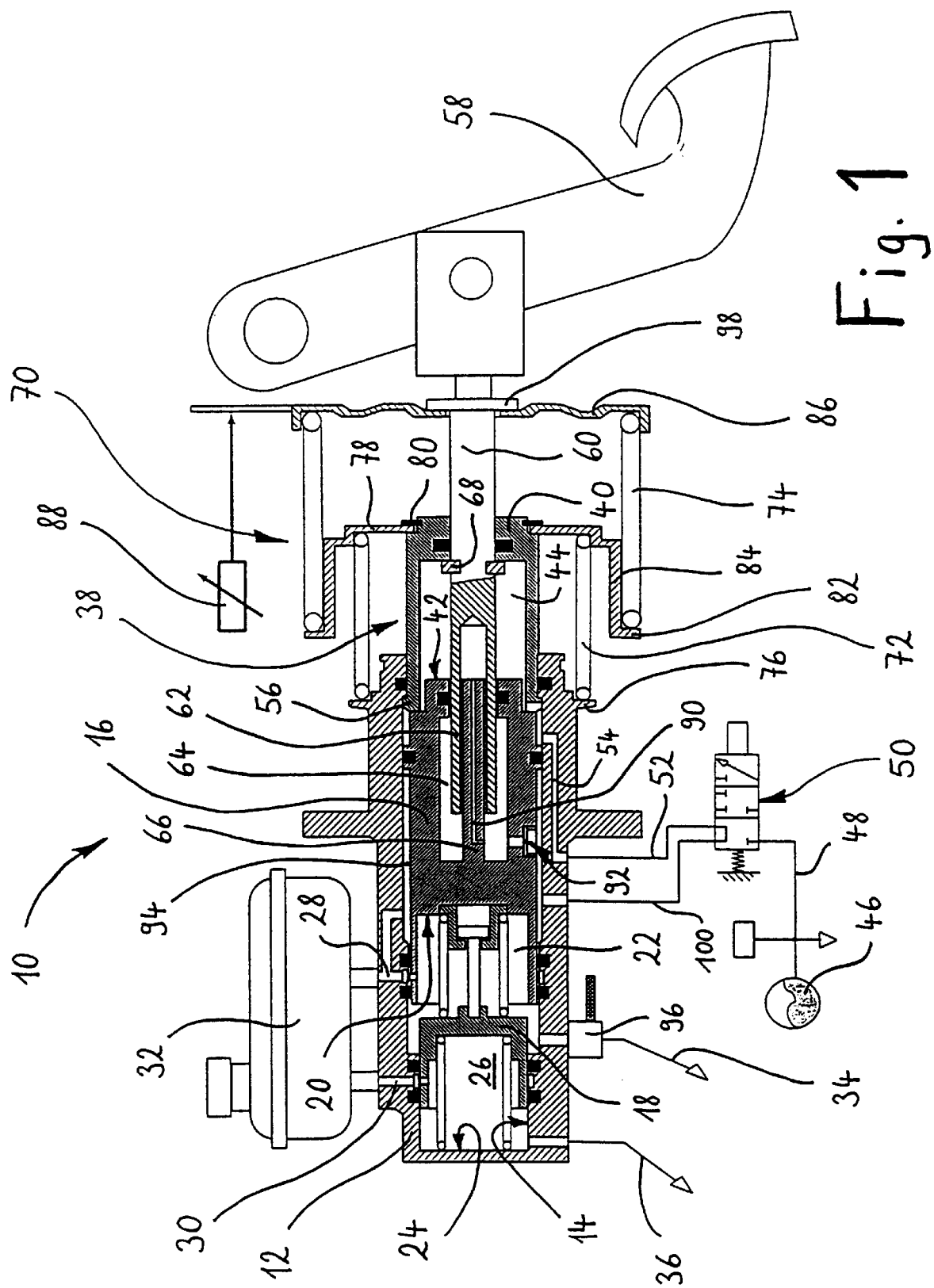
FIG. 1 shows a first embodiment of a brake power generator/master cylinder unit according to the invention in longitudinal section.

FIG. 1 shows a fully hydraulic brake power generator/master cylinder unit, designated as a whole by 10, for a hydraulic vehicle brake system. The unit 10 has an elongate housing 12 with a bore 14 formed therein. A primary piston 16 and a secondary piston 18 are arranged sealingly and displaceably in the bore 14. One end wall 20 of the primary piston 16, together with the end wall, facing it, of the secondary piston 18 and the bore 14, delimits a first pressure chamber 22, whilst the secondary piston 18, of hollow design here, delimits, together with the bore 14 and the end wall 24 of the latter, a second pressure chamber 26. The two pressure chambers 22 and 26 are connected to a reservoir 32 for hydraulic fluid by lines 28 and 30 respectively. The first pressure chamber 22 is intended for connection to a first brake circuit of the hydraulic vehicle brake system by means of a line 34 indicated merely diagrammatically, whilst the second pressure chamber 26 is intended for connection to a second brake circuit of the vehicle brake system via an identical line 36.

In order to generate a hydraulic boosted brake power, the unit 10 has a hydraulic booster stage designated as a whole by 38. This booster stage 38 includes a piston which is guided sealingly and displaceably in the bore 14 and is designed, here, as a cup-shaped hollow piston 40 and which, as illustrated, projects out of the bore 14 of the housing 12. The cavity of this cup-shaped hollow piston 40, together with the other end wall 42 of the primary piston 16, said end wall being located opposite the end wall 20, delimits a booster chamber 44. Hydraulic fluid can be supplied under pressure to the booster chamber 44 from a pressure accumulator 46 via a connecting line 48, an electromagnetic valve 50, a further connecting line 52 and an inlet line 54. The hydraulic pressure supplied ensures that the hollow piston 40 is held in the position illustrated in FIG. 1, in that an annular collar 56 present on the outside of the hollow piston 40 is pressed against a corresponding stop in the bore 14, with the result that the hollow piston 40 is prevented from slipping out of the latter.

In order to actuate the brake power generator/master cylinder unit 10, there are a brake pedal 58 and a rod-shaped input member 60 which is articulated on the latter and which is displaced to the left in relation to the figures when the brake pedal 58 is depressed. The input member 60 passes sealingly and displaceably through the cup-shaped hollow piston 40 and extends with its hollow end region 62, likewise sealingly and displaceably, into a damping chamber 64 which is arranged in the primary piston 16 and the function of which will be explained in more detail later.

Located in the damping chamber 64 is a pin-shaped projection 66 which is arranged coaxially to the input member 60 and is fixedly connected to the primary piston 16. The diameter of the projection 66, which is cylindrical here, is selected in such a way that the latter fits exactly into the hollow end portion 62 of the input member 60. The input member 60 is thus guided on the pin-shaped projection 66. FIG. 1 illustrates the initial position of the input member 60, said initial position being defined by a spring ring 68 which is arranged on the input member 60 and, in the initial position, bears on the bottom of the cup-shaped hollow piston 40 in the booster chamber 44.

For artificial, that is to say simulated brake pressure feedback to the brake pedal 58, the brake power generator/master cylinder unit has a spring arrangement, designated as a whole by 70, which, in the exemplary embodiment illustrated, consists of a first spring 72 and of a second spring 74. The first spring 72 is a helical spring which coaxially surrounds the hollow piston 40 and which is clamped between a supporting flange 76 on the outside of the housing 12 of the unit 10 and a first, here essentially cap-shaped holding plate 78 held on the outside of the bottom of the hollow piston 40, for example by means of a spring ring 80. The second spring 74, likewise designed as a helical spring and arranged coaxially to the input member 60, has a larger diameter than the first spring 72. Said second spring is axially supported at one end on a radially outward-projecting annular flange 82 of the first holding plate 78, is guided by an axial portion 84 of the first holding plate 78 and is supported at its opposite other end on a second, essentially panel-shaped holding plate 86. As is apparent from the figures, the input member 60 passes in the axial direction both through the first holding plate 78 and through the second holding plate 86.

The second spring 74, which urges the two holding plates 78 and 86 axially apart from one another, has a detectably greater spring force than the first spring 72. In the present exemplary embodiment, this is achieved in that the spring constant of the second spring 74 is markedly greater than the spring constant of the first spring 72. Alternatively, however, it is also possible to achieve this in that, in the initial position shown in FIG. 1, the first spring 72 is at least almost expanded, whilst the second spring 74 is installed between the first holding plate 78 and the second holding plate 86 in the precompressed state, that is to say under considerable prestress. The spring constants of the two springs 72 and 74 then do not need to differ markedly from one another. In the last-mentioned alternative, however, the second spring 74 must be prevented from expanding, so as not to exert any actuating force on the unit 10. This may be carried out, for example, by chambering of the second spring 74.

The functioning of the first exemplary embodiment illustrated in FIG. 1 is now described. In order to actuate the brake power generator/master cylinder unit 10, the brake pedal 58 is depressed by the vehicle driver in the usual way. At the same time, the input member 60 articulated pivotably on the brake pedal 58 is displaced axially into the housing 12, and this displacement is detected by a displacement sensor 88 suitably coupled to the input member 60 or the brake pedal 58. The end portion 62 of the input member 60, said end portion being guided on the pin-shaped projection 66, moves into the damping chamber 64 filled with hydraulic fluid, hydraulic fluid being forced out of the hollow end portion 62 through a duct 90 in the pin-shaped projection 66 into the damping chamber 64. Excess hydraulic fluid in the damping chamber 64 flows through a throttle 92 arranged in the primary piston 16 out of the damping chamber 64 into an annular space 94 which is arranged radially between the primary piston 16 and the wall of the bore 14 and which is connected to the reservoir 32. In this case, the fluid volume forced out of the damping chamber 64 corresponds to the relative stroke between the input member 60 and the primary piston 16. The throttled flow-off of hydraulic fluid out of the damping chamber 64 and the likewise throttled inflow of hydraulic fluid into the damping chamber 64 during a return movement of the input member 60 effectively damps the movement of the latter which precedes any intended pressure change. In addition to the throttle 92, the duct 90 may also be designed in such a way that it has a throttling effect.

The displacement of the input member 60, said displacement being detected by the displacement sensor 88, is processed by an electronic control apparatus, not illustrated here, which transfers the electromagnetic valve 50 into the pressure buildup position, in which pressurized hydraulic fluid can pass out of the pressure accumulator 46 into the booster chamber 44. The pressure build-up position is maintained until the pressure corresponding to the detected input member displacement is reached in the booster chamber 44. The pressure building up in the booster chamber 44, on the one hand, holds the hollow piston 40 in its initial position reproduced in FIG. 1 and, on the other hand, presses the primary piston 16 to the left, thereby conventionally generating, in the first pressure chamber 22, pressure which is propagated, via a corresponding displacement of the secondary piston 18 to the left, into the second pressure chamber 26 and out of the pressure chambers 22 and 26 into the wheel brakes connected thereto (not shown here). The relative displacement between the hollow end portion 62 of the input member 60 and the pin-shaped guide projection 66 is hydraulically damped, in this case, by the throttle 92.

As soon as a brake pressure corresponding to the executed input member displacement has been built up, which, in the exemplary embodiment illustrated, may be detected by means of a pressure sensor 98 connected to the first pressure chamber 22, the electromagnetic valve 50 is switched into its pressure holding position, in which hydraulic fluid from the booster chamber 44 can neither flow in nor flow off.

The displacement of the input member 60 into the master cylinder, which takes place during actuation, is transmitted via an annular collar 98 of the input member 60 to the second holding plate 86, so that the second spring 74 is compressed according to the displacement of the input member 60. A driver who actuates the brake pedal 58 and who does not directly receive from the unit 10 any feedback on the brake pressure built up in the pressure chambers 22 and 26 is thus given, by means of the counterforce of the second spring 74, artificial brake pressure feedback which is the greater, the further the input member 60 has been displaced and the more the spring 74 has been compressed correspondingly.

When the actuation of the unit 10 is to be terminated, the driver takes his foot off the brake pedal 58 and the input member 60 moves out of the housing 12 back into its initial position. This return movement is detected by the displacement sensor 88, and the electronic control apparatus, not illustrated, transfers the electromagnetic valve 50 into the pressure reduction position, reproduced in FIG. 1, in which hydraulic fluid can flow out of the booster chamber 44 via the electromagnetic valve 50, a connecting line 100, the annular space 94 and a line 28 back into the reservoir 32. Since the hollow piston 40 is prevented by the pressure in the booster chamber 44 from being displaced into the bore 14, the first spring 72 remains ineffective during the operating cycles described above.

It will be assumed below that the booster stage 38 is defective for any reason, that is to say, after the brake pedal 58 has been depressed, no pressurized hydraulic fluid is supplied to the booster chamber 44. Although, even in this case, the displacement of the input member 60 is transmitted via the annular collar 98 and the second holding plate 86 to the second spring 74, the latter is not, or at all events not appreciably, compressed, since the counterforce holding the hollow piston 40 in the initial position is absent. Instead of being compressed, the second spring 74 therefore transmits the actuating force via the first holding plate 78 to the hollow piston 40 which is thereupon released from its initial position and is displaced into the bore 14, said hollow piston taking the primary piston 16 bearing on it with it, so that brake pressure is built up in the pressure chambers 22 and 26.

The result of the displacement of the hollow piston 40 into the bore 14 is that the first spring 72 of the spring arrangement 70 is compressed correspondingly and thus ensures brake pressure feedback to the brake pedal 58 instead of the second spring 74. Since the spring force of the first spring 72 is detectably lower than the spring force of the second spring 74, the actuation of the unit 10 can take place with relatively little force, even when the booster stage 38 has failed.

In a subsequent stage of actuation, the pin-shaped guide projection 66 of the primary piston 16 butts onto the bottom of the hollow end portion 62 of the input member 60, with the result that the input member 60 and the primary piston 16 are directly coupled mechanically. Any further depression of the brake pedal 58 then displaces the primary piston 16 directly in the pressure build-up direction.

Figure 2:
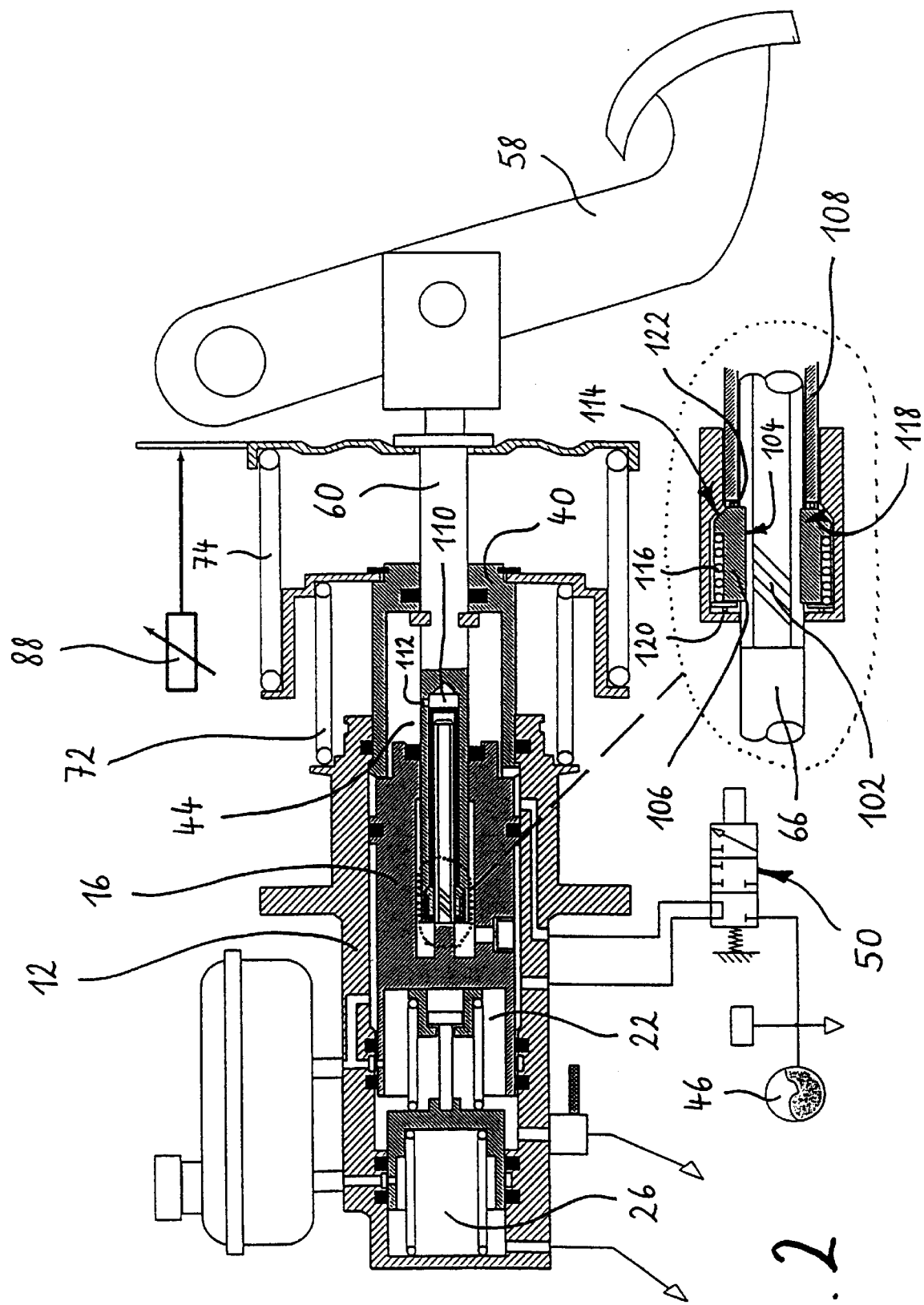
FIG. 2 shows a somewhat modified second embodiment in longitudinal section, at the start of braking.
Figure 3:
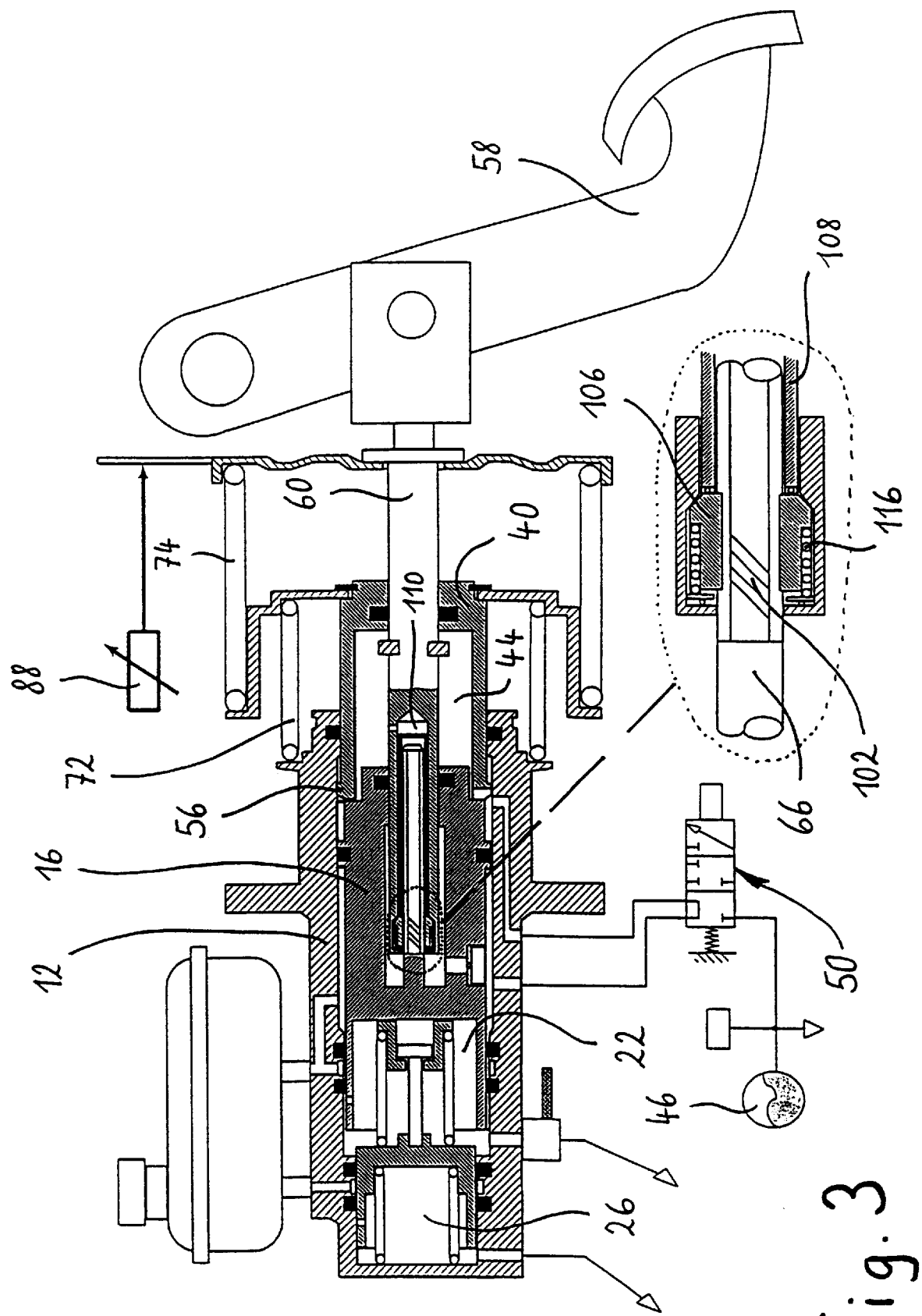
FIG. 3 shows the second embodiment in longitudinal section, but in a position which is assumed during braking with a defective hydraulic booster stage.

FIGS. 2 and 3 illustrate a somewhat modified second exemplary embodiment of the brake power generator/master cylinder unit 10, which is improved in terms of mechanical coupling between the input member 60 and the primary piston 16 in the event of a defect of the hydraulic booster stage 38. For this purpose, the pin-shaped projection 66 of the primary piston 16, said projection being arranged in the damping chamber 64, is provided with a thread 102, with which an internal thread 104 of a sleeve 106 is in engagement, which sleeve is arranged coaxially to the pin-shaped projection 66 in the hollow end portion 66 of the input member 60. The sleeve 106 is part of a coupling between the input member 60 and the primary piston 16, said coupling switching in a pressure-dependent manner and, furthermore, also having a thrust sleeve 108 axially following the sleeve 106 and coaxially surrounding the pin-shaped projection 66. The thrust sleeve 108 is closed on the end face at its end remote from the sleeve 106, so as to form, in the hollow end portion 62, a chamber 110 which is in fluid connection with the booster chamber 44 via a transverse bore 112.

The sleeve 106 has a clamping cone 114 on the outside, on the side facing the thrust sleeve 108, and is prestressed in the direction of said thrust sleeve 108 by means of a spring 116. A complementary clamping cone 118 is formed opposite the clamping cone 114 in the hollow end portion 62 of the input member 60. A bearing 120 and 122 is arranged in each case between the open end of the hollow end portion 62 and the sleeve 106 and between the sleeve 106 and the thrust sleeve 108, so that the sleeve 106 can rotate about the thread 102 of the pin-shaped projection 66 when the two clamping cones 114, 118 are not in engagement with one another.

The coupling switching in a pressure-dependent manner functions as follows: as soon as hydraulic fluid is fed under pressure to the booster chamber 44 during a braking operation, the pressure enters the chamber 110 and displaces the thrust sleeve 108 in such a way that pressure is exerted on the sleeve 106 and the two clamping cones 114, 118 are therefore separated from one another (see the detail in FIG. 2). Since the thread pairing of the internal thread 104 of the sleeve 106 and of the thread 102 formed on the projection 66 is free of selflocking, when the input member 60 is being displaced into the housing 12 the sleeve 106 rotates about the pin-shaped projection 66, without the displacement of the input member 60 thereby being impeded.

In the event of an operating failure of the hydraulic booster stage 38, in the booster chamber 44, and therefore also in the chamber 110, there is no hydraulic pressure which could displace the thrust sleeve 108. The two clamping cones 114 and 118 are consequently pressed into engagement with one another by the spring 116 (see the detail in FIG. 3), and the sleeve 106 can no longer rotate about the pin-shaped projection 66. Displacement of the input member 60 is therefore transmitted to the primary piston 16 immediately without any loss of actuating travel.

What is claimed is:

1. A fully hydraulic brake power generator/master cylinder unit for a vehicle brake system, with a housing and a bore which is formed therein and in which a primary piston is arranged sealingly and displaceably, an input member for actuating the brake power generator/master cylinder unit, said input member being displaced during actuation, a first pressure chamber which is arranged in the bore and one boundary wall of which is formed by one end wall of the primary piston, a hydraulic booster stage, acting on the primary piston, for boosting the actuating force exerted on the input member, said booster stage comprising a booster chamber with an inlet for hydraulic fluid under pressure, a spring arrangement, acting on the input member counter to an actuating force, for simulating brake pressure feedback via the input member, characterized in that the spring arrangement has a first spring and a second spring which are connected in series, the spring force of the second spring being detectably greater than the spring force of the first spring, and in that when the brake power generator/master cylinder unit is actuated, if the hydraulic booster stage fails essentially only the force of the first spring carries out brake pressure feedback.

2. The brake power generator/master cylinder unit according to claim 1, characterized in that, when the brake power generator/master cylinder unit is actuated, the first spring remains ineffective in terms of brake pressure feedback if the hydraulic booster stage is functioning properly.

3. The brake power generator/master cylinder unit according to claim 1, characterized in that, when the brake power generator/master cylinder unit is actuated, if the hydraulic booster stage fails the second spring is just displaced, together with the input member, in particular relative to the housing.

4. The brake power generator/master cylinder unit according to claim 1, characterized in that the booster stage has a piston guided displaceably in the bore, the first spring being supported functionally between the housing and the piston and the second spring being supported functionally between the piston and the input member.

5. The brake power generator/master cylinder unit according to claim 4, characterized in that the piston is a cup-shaped hollow piston, and in that the booster chamber is delimited by the hollow piston and by the other end wall, located opposite the end wall, of the primary piston.

6. The brake power generator/master cylinder unit according to claim 1, characterized in that the displacement of the input member taking place during the actuation of the brake power generator/master cylinder unit is damped, in particular fluid-damped.

7. The brake power generator/master cylinder unit according to claim 6, characterized in that that end of the input member which faces the brake power generator/master cylinder unit is of piston-shaped design and projects displaceably into damping chamber, out of which fluid forced as a result of displacement of the input member can flow off only through a throttle.

8. The brake power generator/master cylinder unit according to claim 7, characterized in that the input member passes through the booster stage, and in that the damping chamber is arranged in the primary piston.

9. The brake power generator/master cylinder unit according to claim 8, characterized in that an end portion of the piston-shaped end of the input member is hollow and is guided on a pin-shaped projection of the primary piston said projection being arranged in the damping chamber.

10. The brake power generator/master cylinder unit according to claim 9, characterized in that the pin-shaped projection of the primary piston has a duct, one end of which opens into the hollow end portion of the input member and the other end of which opens into the damping chamber.

11. The brake power generator/master cylinder unit according to claim 1, characterized in that, when the brake power generator/master cylinder unit is actuated, the input member is automatically coupled to the primary piston if the hydraulic booster stage has failed.

12. The brake power generator/master cylinder unit according to claim 11, characterized in that a hollow end portion of the input member is guided on a pin-shaped projection of the primary piston, in that the pin-shaped projection is provided with a thread, in that a sleeve rotatable about the pin-shaped projection is arranged in the hollow end portion of the input member coaxially to said projection and has an internal thread which is in engagement free of selflocking, with the thread, in that the sleeve has a clamping cone and is prestressed resiliently by means of the latter into engagement with a complementary clamping cone which is formed in the hollow end portion of the input member, and in that in the hollow end portion of the input member there is an axially displaceable thrust sleeve which coaxially surrounds the pin-shaped projection and of which the axial displacement counter to the resilient prestress of the sleeve causes the two clamping cones to come out of engagement.

13. The brake power generator/master cylinder unit according to claim 12, characterized in that the hollow end portion of the input member is in fluid connection with the booster, stage, in such a way that, when the booster stage is functioning properly, the hydraulic pressure in the booster stage displaces the thrust sleeve counter to the resilient prestress of the sleeve.

14. The brake power generator/master cylinder unit according to claim 6, characterized in that the displacement of the input member taking place during the actuation of the brake power generator/master cylinder unit is fluid-damped.

* * * * *